United States Patent [19]

Mould

[11] Patent Number: 5,032,272
[45] Date of Patent: Jul. 16, 1991

[54] FILTER FRAME WITH A DUAL CHANNEL GUIDE STRIP

[75] Inventor: Christopher J. Mould, Thurmaston, England

[73] Assignee: BTR plc, United Kingdom

[21] Appl. No.: 372,923

[22] Filed: Jun. 29, 1989

[30] Foreign Application Priority Data

Jul. 6, 1988 [GB] United Kingdom ............... 8816126

[51] Int. Cl.⁵ ............................................. B01D 29/05
[52] U.S. Cl. .................................. 210/486; 210/499; 55/511; 55/DIG. 31
[58] Field of Search ................. 55/511; 210/232, 314, 210/331, 346, 347, 445, 451, 455, 486, 489, 499

[56] References Cited

U.S. PATENT DOCUMENTS

| | | | |
|---|---|---|---|
| 2,677,436 | 5/1954 | Mazek | 55/DIG. 31 |
| 2,885,083 | 5/1959 | Peterson et al. | 210/486 |
| 2,902,165 | 9/1959 | Imershein | 210/499 |
| 3,339,742 | 9/1967 | Kracklauer | 210/486 |
| 3,475,884 | 11/1969 | Kulzer | 55/341 |
| 4,790,935 | 12/1988 | Johnson | 210/232 |

FOREIGN PATENT DOCUMENTS

| | | |
|---|---|---|
| 3014565 | 10/1981 | Fed. Rep. of Germany . |
| 3421856 | 7/1985 | Fed. Rep. of Germany . |
| 2218922 | 9/1974 | France . |

*Primary Examiner*—Robert A. Dawson
*Assistant Examiner*—Wanda L. Millard
*Attorney, Agent, or Firm*—Stevens, Davis, Miller & Mosher

[57] ABSTRACT

For use in internally supporting a filter element of the fabric, bag-shape type there is provided a support frame having a border at least a part of which is defined by a single guide strip typically substantially W-shaped in cross-section and which presents two guide channels to face inwards of the frame for the spaced apart support of two mesh layers. A single deformed length of the guide strip may be used to form a base and two side portions of a rectangular shaped support frame.

11 Claims, 5 Drawing Sheets

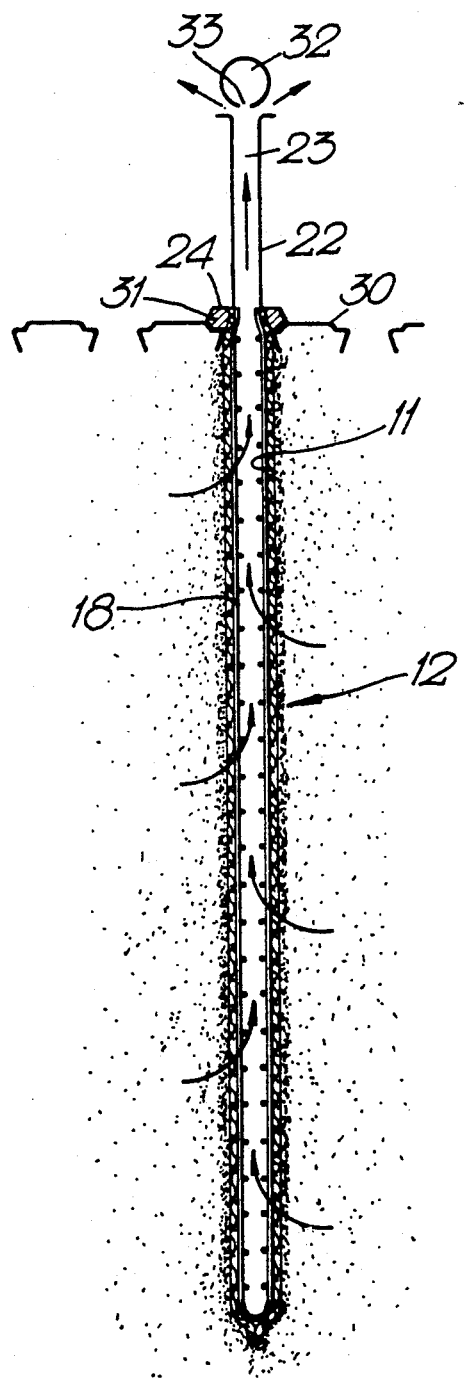
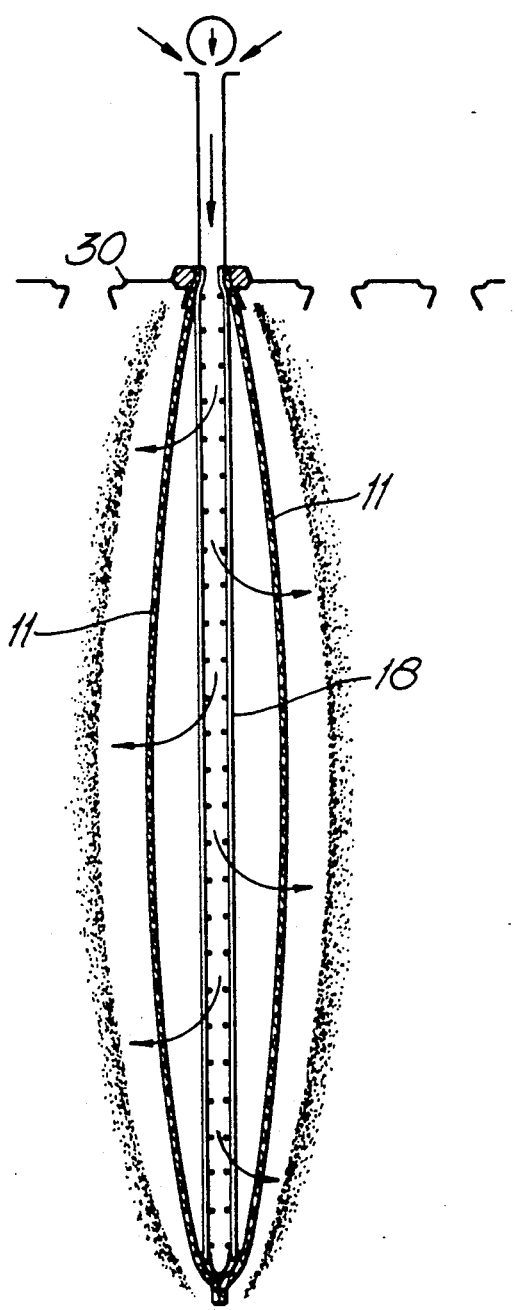
Fig. 3a.
Fig. 3b.

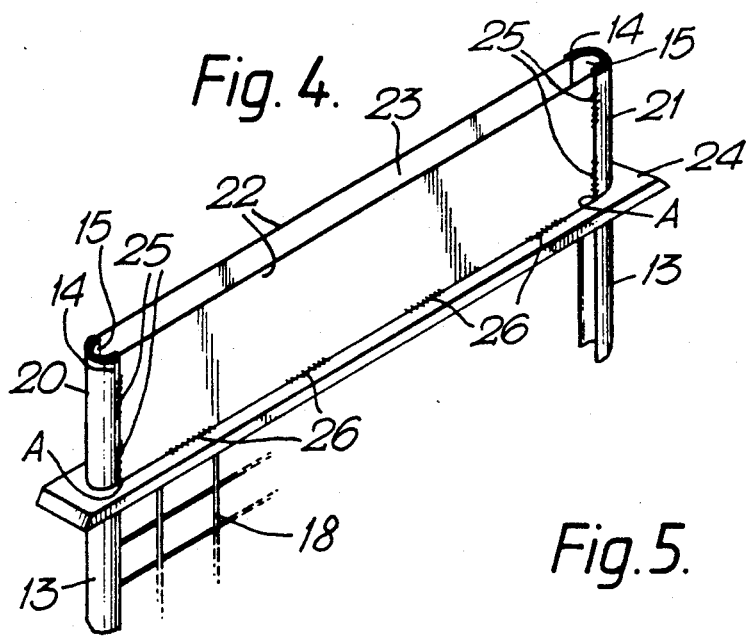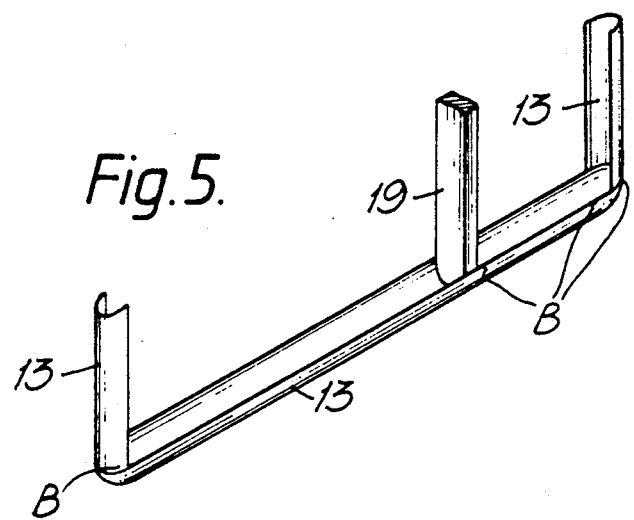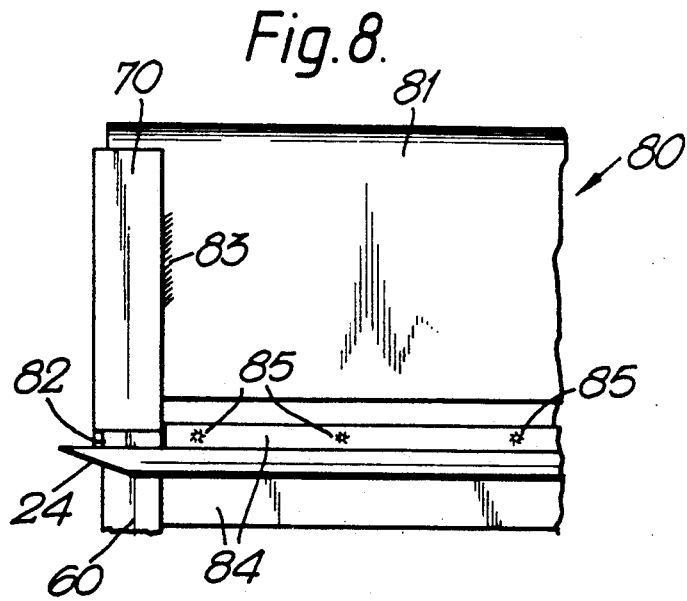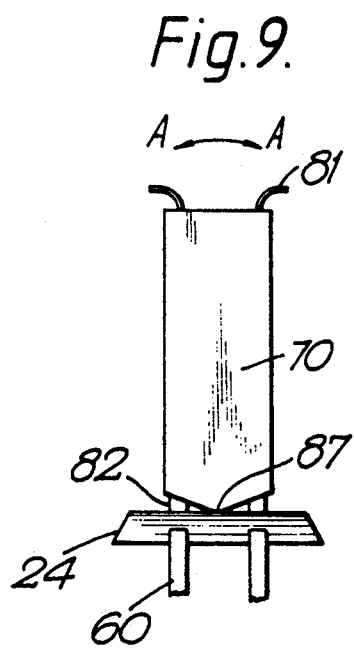

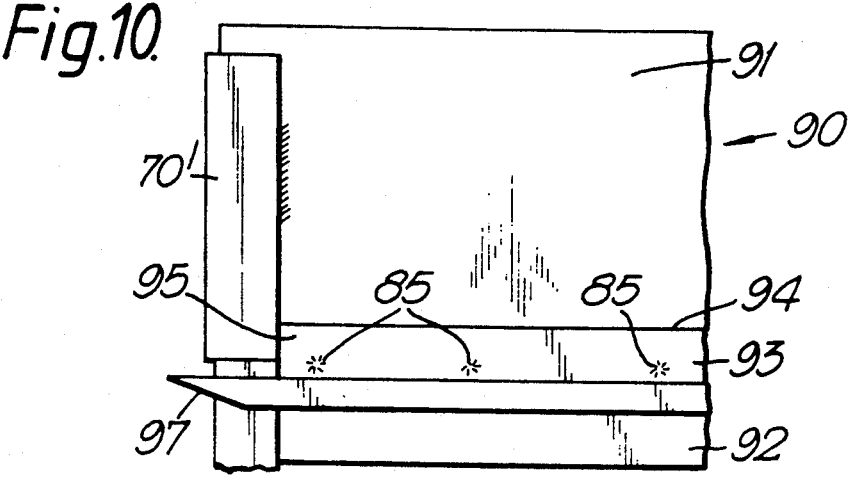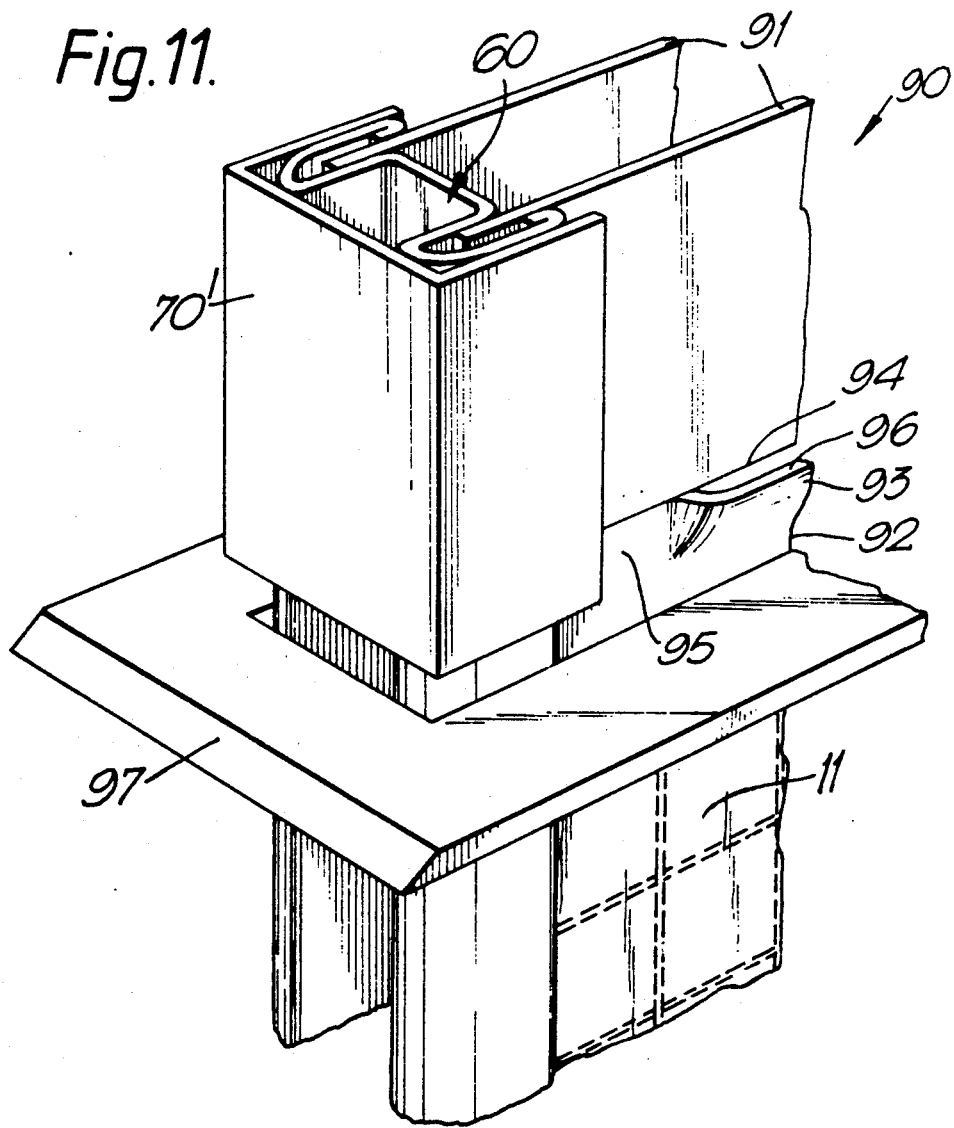

FILTER FRAME WITH A DUAL CHANNEL GUIDE STRIP

This invention relates to a filter support structure and a filter module comprising a filter element and support structure. The invention is directed in particular, though not exclusively, to a filter module and a filter support structure for use in a heavy duty industrial type filter unit of the kind required to operate on a continuous basis for the removal of relatively large concentrations of particulate matter from a flow of air or other gas.

In one well established design of a heavy duty industrial type filter unit a plurality of filter modules, of the kind each having a fabric filter element, are individually releasably secured to a seal frame provided, within a filter housing, such as a cabinet or duct, whereby the filter modules may be removed readily for periodic maintenance or replacement.

The fabric filter elements typically are each of an envelope-type shape, i e of relatively flat and rectangular form, and open along only one edge. That edge is provided with an annular seal strip for abutment with an annular sealing flange formed on a filter element support structure to effect a gas-tight seal between the filter module and the seal frame of the filter housing. Commonly a plurality of these envelope-type fabric filter modules are supported within the filter housing to hang side-by-side from the seal frame with their confronting faces slightly spaced apart for the free flow of gas therebetween.

For relative ease of removal of dust accumulating at the filter elements the direction of gas flow through the filter elements is arranged to be from outside to within each envelope. Collapse of each fabric filter under the differential pressure arising with this direction of gas flow is prevented by the aforementioned support structure which comprises a three-dimensional metal wire mesh insert portion within a filter element envelope.

Removal of accumulated dust from the exterior surfaces of the filter elements is achieved by sequential intermittent internal pressurization of each element to cause a momentary reverse flow therethrough, the reverse flow serving to dislodge an accumulated dust cake which is arranged to fall down to a collection hopper.

The internal pressurization of the envelope-shape fabric filter elements tends inherently to distort the shape of the elements towards a curved bag-like shape. This distortion, combined with the actual reverse flow of gas through the element, is useful in assisting removal of the dust cake even though the magnitude of distortion is necessarily limited by the internal wire mesh insert portion of the support frame since otherwise that insert portion would not be so effective in supporting the envelope-shape in a slightly open form during normal flow for filtration. It will therefore be appreciated that in consequence of intermittent distortion of the filter elements, which are of a substantially inelastic material, their associated support structures are cyclically stressed; in some applications it has been found that after a prolonged period of use the frame is prone to fatigue damage.

Fatigue damage of the support frame normally tends to arise in a special channel section guide strip which defines three sides of an outer border of the support frame. That guide strip extends within a filter element when the support frame is assembled with a filter element, and within the filter element it serves two important functions. One is to maintain spaced apart two planar metal meshes and the other is to present a smooth external surface to support the filter element without risk of cutting or other damage to the latter even during reverse flow conditions. External of the filter element, portions of the guide strip extend through a sealing flange, to which they are welded, and locate a pair of spaced metal plates to define therewith an outlet channel for the normal flow of air from the filter element. Typically the channel section guide strip has a double C cross-section, of a nested configuration as shown in FIG. 2 and is formed by spot welding together, one within the other, two C-section strips of different curvatures.

Fatigue damage can be avoided or reduced by use of lower reverse flow pressures but the dust cake is not then removed so efficiently. Conventionally the risk of fatigue damage is minimized by the use of thicker materials for forming the support frame, but this leads to undesirable extra weight and cost.

The present invention has as one of its objects the provision of a filter module and a filter support frame for a filter module which possesses a good resistance to fatigue damage without incurring any significant additional weight or cost.

In accordance with one of its aspects the present invention provides a filter element support frame at least part of the border of which is defined by a single guide strip which presents in an inwardly facing direction two guide channels for the spaced apart support of edges of two mesh layers, said inward facing guide channels being spaced apart by material of the strip which defines an outward facing channel.

It will therefore be appreciated that the invention teaches the use of a guide strip which is of substantially a W-shape in cross-section and which is arranged with the external apices of the two V-like profiles of that cross-sectional shape facing outwards from the support frame.

Said two V-like profile portions of the cross-sectional shape may be in contact such that the outward facing channel is closed, but for most applications it is envisaged that the outward facing channel will be of an open and typically parallel-sided form.

A particularly suitable material for forming the guide strip is a deformable metal such as cold rolled steel (e g CR4 type) though other more expensive materials such as a corrosion resistant steel may be used.

The sides of the guide strip preferably each are of double thickness at least at their free edges, i e those edges which face inwards to the center of the support frame. It is further preferred, in the case of a guide strip of a deformable material, that those edges are formed by rolling over the longitudinal edges of the strip during its deformation, for example to form so-called Dutch bends, so that edge portions of the original strip lie in the two guide channels that face inwards of the support structure.

Preferably all three boundary edges of the support frame portion for location within a filter element to support internal, bottom and side edges of the filter element are formed by a single length of said single guide strip of a deformable type, the strip being bent locally to form two corner regions between a base and two side portions.

In the case of a support frame comprising a sealing flange for positioning of the frame in sealed relationship within a filter housing seal frame the guide strip preferably extends through the flange to support a pair of spaced plates and therewith define an outlet channel for air or other gas which has flowed through a filter element and mesh layer. The sealing flange may be free from rigid attachment relative to the guide strip. Thus it may be unattached or non-rigidly secured relative to the guide strip to permit relative rocking movement about at least one axis, e g an axis parallel with the length of the sealing flange.

In accordance with a further of its aspects the present invention provides a filter module comprising a filter element supported by a support frame of the invention.

Two embodiments of the present invention will now be described, by way of example, with reference to the accompanying diagrammatic drawings in which:

FIG. 3a is a cross-section on the line 3—3 of FIG. 1 of the support frame and a filter element in situ in a seal frame and in a filtering mode;

Figure 1:
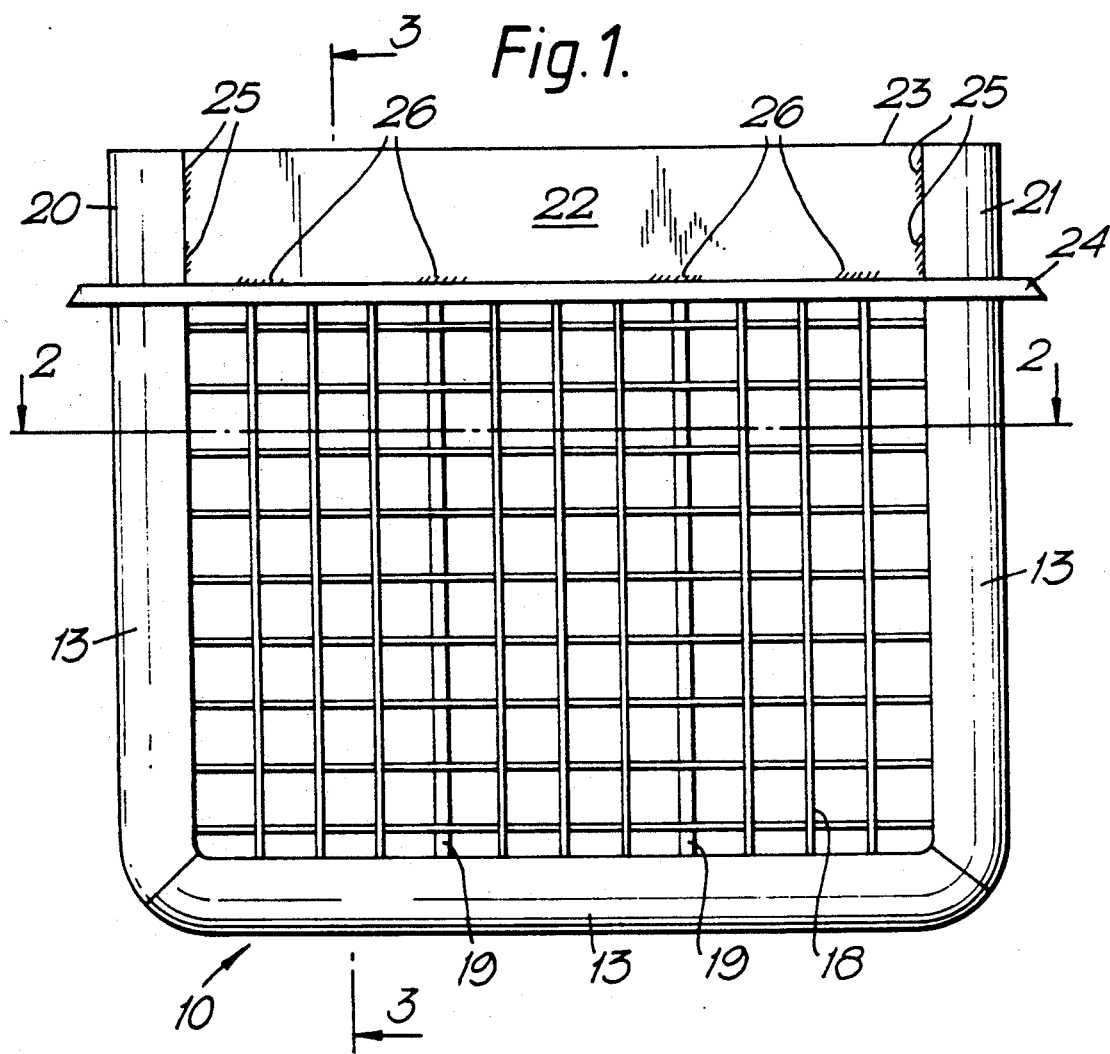
FIG. 1 is a front view of a filter element support frame of known construction.
Figure 2:
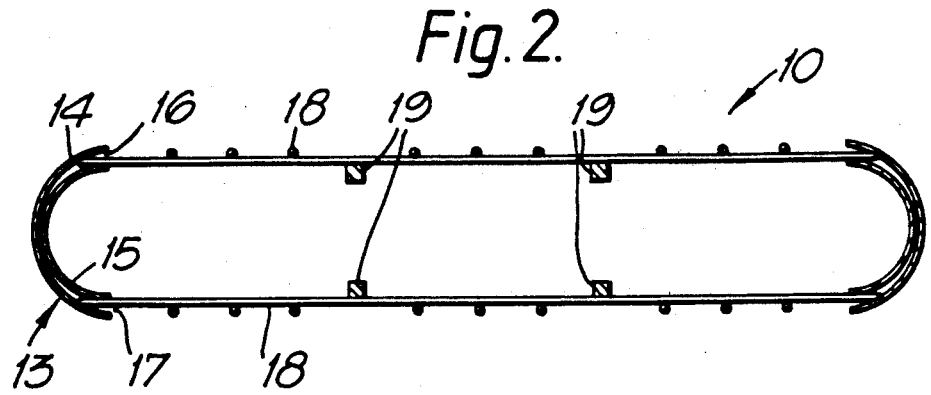
FIG. 2 is a section on the line 2—2 of FIG. 1.
Figure 6:
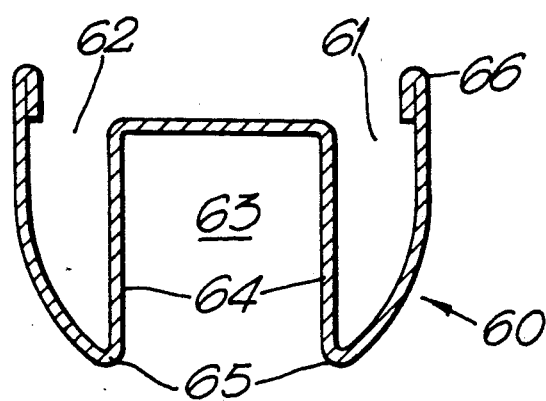
Figure 7:
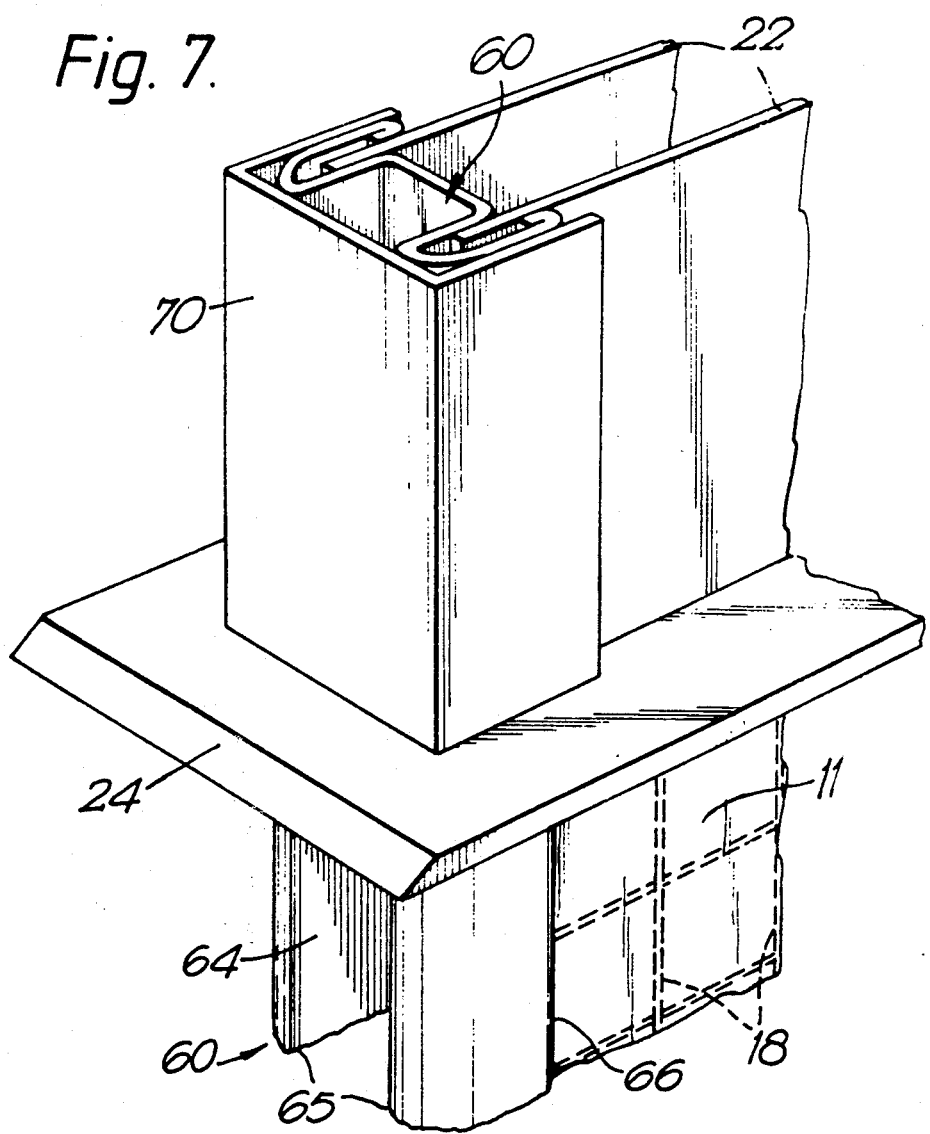

FIG. 3b corresponds with FIG. 3a but with the filter element in a cleaning mode;

FIGS. 4 and 5 are perspective views of parts of the support frame of FIGS. 1 and 2;

FIG. 6 is a transverse cross-sectional view of part of a guide strip of a filter element support frame in accordance with the present invention;

FIG. 7 is a perspective view of a further feature of a support frame in accordance with the present invention;

FIGS. 8 and 9 are front and side views respectively of part of a support frame in accordance with another embodiment of the present invention, and FIGS. 10 and 11 are front and perspective views respectively of part of a support frame in accordance with yet another embodiment of the present invention.

A support frame 10 for the filter element 11 of a filter module 12 (see FIGS. 3a and 3b) of a well known and long established construction is shown in detail in FIGS. 1 and 2.

The support frame 10 comprises three channel section boundary guide strips 13 each of a composite construction, the boundary guide strips being welded together thereby to define three edges of the generally rectangular shaped support frame.

Each boundary guide strip 13 comprises an outer deformed metal strip 14 (see FIG. 2) of a C-shape in transverse section and within which there is spot-welded a second, smaller metal strip 15 of a similar cross-sectional shape. By virtue of the size difference between the two strips 14,15, the resulting guide strips possess a pair of side grooves 16,17.

The boundary guide strips are arranged in the support frame with the grooves 16,17 facing inwards, and these grooves provide location and support for spaced-apart two metal mesh members 18, which, in use of the filter module, resist internal collapse of a partly open envelope-shape filter element under the action of a differential pressure. The lower guide strip also provides location for auxiliary mesh support bars 19.

In constructing the support frame the welded corners at the junctions of the three boundary guide strips are ground smooth so that in conjunction with the smooth external surface of the outer C-shape strip 14 the support frame is devoid of any sharp edges which might otherwise damage a filter element.

Between the two free end regions 20,21 of the boundary guide strips 13 at the sides of the support frame two metal plates 22 are welded at positions 25 into position in the grooves 16,17 to form an outlet passage 23. For location of the support frame relative to the seal frame of a filter housing an outwardly extending sealing flange 24 is welded at positions 26 to the side guide strips and those lower edges of the metal plates 22 which lie adjacent the metal meshes 18.

FIG. 3a shows the aforementioned support frame 10 and a filter element 11 fitted to the seal frame 30 of a filter housing. When in situ in the housing a sealing strip 31 around the open edge of the filter element lies between the sealing flange 24 and seal frame 30 to assist in ensuring an air-tight seal therebetween.

As shown also in FIG. 3a when in situ the filter module lies with its outlet passage aligned with an air jet tube 32. The tube 32 is formed with a series of longitudinally spaced apertures 33 through which high pressure air may be applied in short intermittent bursts to internally pressurize the filter element for cleaning.

FIG. 3b shows the filter element in its deformed condition at the moment of internal pressurization.

In consequence of the tendency for the filter element to adopt a swollen bag-like shape when internally pressurized, each of the lengths of the boundary guide strips 13 extending around three sides of the metal meshes (i e lying adjacent the two side and the bottom edges of the filter element) is stressed and this results in each length tending to move inwards mid-way between its ends. Most notably this creates a propensity for fatigue failure in the regions where the ends of the side portions are rigidly and inflexibly secured by welding to the sealing flange 24 and metal plates 22 of the outlet channel, as indicated by the region A of FIG. 4. Additionally the deflection causes a propensity for failure at the corner joints B between the three boundary guide strips (see FIG. 5).

In tests conducted on the aforementioned support frame the onset of fatigue failure is usually apparent after 230,000 to 250,000 pressure pulses. In installations in which neighboring filter modules are pulsed simultaneously higher stresses arise due to interaction of the neighboring elements as they come into contact, and in tests for this mode of operation the onset of fatigue failure is usually apparent after 20,000 to 60,000 pressure pulses.

FIG. 6 shows in transverse cross-section the guide strip 60 of a filter element support frame in accordance with one embodiment of the present invention. The guide strip 60 is formed from a single strip of cold rolled steel deformed to a substantially W-type cross-sectional shape as illustrated. A single length of the strip 60 is bent twice to form two support frame corners in contrast to the need for welding to form corners when using the conventional guide strip which cannot be bent satisfactorily to form corners. Other details of construction of the support frame however correspond in essence with those of the conventional, long-established guide frame.

The W-type cross-sectional shape provides a pair of inwardly facing guide channels 61,62 for receiving edges of the metal meshes 18 (see FIG. 7). The two channels are spaced apart by an intervening outwardly facing channel 63 the side portions 64 of which are parallel with one another. Thus the two V-like profiles 65 at the outer surface of the strip are spaced apart. Between the profiles 65 and the strip edges 66 the guide strip presents a smooth convex external profile for support of a filter element. To ensure that the free edges 66 do not cause any damage to a filter element and to assist in strengthening those edges, the strip material is bent over on itself, inwards at those regions in the form of rolled-over edges.

In order that the filter modules of the present invention may be used interchangeably with conventional filter modules the side portions 20,21 of the support frame where they neighbor the metal plates 22, i e at regions corresponding to the free end regions 20,21 of FIG. 1, may be fitted with open rectangular section channel members 70 as shown in FIG. 7 for engaging conventional module supports (not shown) provided in the filter housing to limit relative sideways movement of adjacent filter modules.

A filter module in accordance with the present invention and as described with reference to FIG. 6 has been found on test, when tested singly, to be free from onset of fatigue failure even after 600,000 pressure pulses in contrast to the 230,000 to 250,000 limitation of the conventional design module. In the case of tests on filter modules pressure pulsed in adjacent pairs, over 450,000 pressure pulses have been possible prior to onset of fatigue failure in contrast to the 20,000 to 60,000 limitation of the conventional filter design module.

The improved fatigue performance has been attained without the need to use a heavier or more costly construction and thus no significant cost disadvantages arise.

The improvement in fatigue life of the guide strip of a filter frame in accordance with the present invention results, in some applications, in other parts of a filter unit presenting a limitation to fatigue life. Particularly in tests simulating an arrangement of filter modules which are pressure pulsed in adjacent pairs it has been found that the use of an improved filter element support frame of the present invention can lead to fatigue cracking of the seal frame 30.

In an attempt to mitigate the risk of fatigue damage of the seal frame 30 the present invention provides in a further of its aspects that the header plates 22 shall each be of a two-part construction such that the sealing flange is non-rigidly secured to the outer guide strip of the support frame.

An example of a support frame 80 having a two-part header plate construction is shown in FIGS. 8 and 9.

An upper header plate part 81 extends between the two free end regions 82 of the guide strip 60 and is welded at positions 83 to those end regions. A lower header plate part 84 lies beneath and is spaced slightly from the upper part 81. The lower part 84 is spot or tack welded at positions 85 to the sealing flange 24 and extends both above and below that flange as viewed in FIG. 8.

Above the flange 24 the ends of the lower header plate 84 are spaced from the guide strip 60, but below the flange 24 the ends of the lower plate are located within the channels 61,62 of the guide strip 60. Additionally, the sealing flange 24 generally is spaced very slightly from the outer surfaces of the guide strip 60 and is arranged to support the remainder of the support frame by engagement of the apices 87 of the lower V-shaped ends of the rectangular members 70 (see FIG. 9) with the upper surface of the sealing flange. In consequence of this construction the filter frame is free to rock relative to a seal frame 30 about an axis parallel with the length of the flange 24 (ie rocking in the direction of arrows A of FIG. 9).

Another example of a support frame having header plates each of a two-part construction is shown in FIGS. 10 and 11.

A support frame 90 has an upper header plate part 91 which corresponds with the aforedescribed part 81 of FIG. 8 and a lower part 92 which corresponds with the aforedescribed part 84 except that it additionally comprises at its upper region an extension portion 93 by virtue of which it is adapted for abutment with the lower edge 94 of the upper plate part 91.

End portions 95 (one only shown) of the extension portion 93 are generally co-planar with the main body of the lower plate part 92 but between the end portions the metal is bent to form an inclined lip portion 96. In situ in the header frame the lip portion 96 lies outwards, i e faces away from the lip portion of the other lower plate part and the end portions 95 are positioned for abutment with the lower edge 94 of the upper plate part 91.

The sealing flange 97 corresponds with the flange 24 of FIG. 8 but the external channel members 70' differ in that their lower ends do not have the apices 87 but are cut square and positioned always to lie slightly spaced from the flange 97.

When the frame 90 is clamped in position in a filter unit in a manner which urges the channel members 70' towards the flange 97 the end portions 95 of the lower plate parts will abut respective lower edges 94 of the upper plate parts In consequence when the filter frame is subject to a tendency to rock, it will do so about regions of line contact type support (ie about two axes) in contrast to the two-point contact of the apices 87 against the sealing frame 24 of FIGS. 8 and 9.

The provision of the lip portions 96 is believed to result in an enhanced entrainment of auxiliary air when pressurized air is directed from an air jet tube (such as tube 32 of FIG. 3a) in a direction downwards between the header plates. This further facilitates an effective filter cleaning action.

What I claim is:

1. A filter element support frame of generally rectangular shape having a border defined at least in part by two side portions interconnected by a base portion and each of said portions consisting essentially of a single guidestrip which presents two guide channels which face inwards of the support frame to provide two inward facing guide channels for the spaced apart support of respective edges of two mesh layers against movement toward one another, said inward facing guide channels being spaced apart by material of the strip which defines an outward facing channel said guide channels having free edges which are bent over upon themselves to form a smooth edge.

2. A support frame according to claim 1 wherein said free edges have been formed by rolling over edges of a deformable strip during its shaping to form the guide channels.

3. A support frame according to claim 2 wherein said rolled over edges lie within the guide channels.

4. A support frame according to claim 1 wherein the outward facing channel is open.

5. A support frame according to claim 4 wherein the outward facing channel has parallel sides.

6. A support frame according to claim 1 wherein a single length of said single guide strip has been bent locally to form corner regions between said base and two side portions of the support frame border.

7. A support frame according to claim 1 and comprising a sealing flange through which the guide strip extends.

8. A support frame according to claim 1 and having a sealing flange for location of the support frame relative to the seal frame of a filter unit housing, said sealing flange being free from rigid attachment relative to the support frame guide strip.

9. A support frame according to claim 1 wherein the guide strip forming said side portions is fitted with a rectangular section channel member at each end region remote from said base portion.

10. A support frame according to claim 1 and comprising a pair of header plates adapted for entrainment of air during reverse air-jet pulsation.

11. A filter module comprising the assembly of a support frame according to claim 1 and a filter element supported by said frame.

* * * * *